(12) United States Patent
Rayl

(10) Patent No.: US 8,290,690 B2
(45) Date of Patent: Oct. 16, 2012

(54) METHOD AND SYSTEM FOR REDUCING OPERATING ERRORS IN A VARIABLE VALUE ACTUATION SYSTEM

(75) Inventor: Allen B. Rayl, Waterford, MI (US)

(73) Assignee: GM Global Technology Operations LLC

( * ) Notice: Subject to any disclaimer, the term of this patent is extended or adjusted under 35 U.S.C. 154(b) by 617 days.

(21) Appl. No.: 12/556,190

(22) Filed: Sep. 9, 2009

(65) Prior Publication Data

US 2011/0060516 A1    Mar. 10, 2011

(51) Int. Cl.
*G06F 19/00* (2011.01)
*F02D 41/00* (2006.01)

(52) U.S. Cl. ..................................... 701/112

(58) Field of Classification Search .................. 701/112, 701/113, 101, 102, 115; 123/198 D, 198 F, 123/198 R
See application file for complete search history.

(56) References Cited

U.S. PATENT DOCUMENTS 6,805,090 B2 * 10/2004 Bertness et al. .......... 123/198 R
8,160,804 B2 * 4/2012 Chominsky et al. .......... 701/112

\* cited by examiner

*Primary Examiner* — Hieu T Vo

(57) ABSTRACT

A method and control module for controlling an engine includes a lift command module that commands a first lift state after detecting an engine shut-down signal and a shut-down delay determination module that determines a shut-down delay period, that continues spark and fuel control before the shut-down delay period and that ends spark and fuel control to shut down the engine after the shut-down delay period.

20 Claims, 4 Drawing Sheets

METHOD AND SYSTEM FOR REDUCING OPERATING ERRORS IN A VARIABLE VALUE ACTUATION SYSTEM

FIELD OF THE DISCLOSURE

The present disclosure relates to variable valve actuation systems, and more particularly to systems for reducing errors in operating variable valve actuation systems.

BACKGROUND OF THE DISCLOSURE

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating cam shaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve assemblies, such as hydraulically-controlled switchable roller finger followers (SRFFs). SRFFs enable two discrete valve states (e.g., a low-lift state or a high-lift state) on the intake and/or exhaust valves.

Referring to FIG. 1, a hydraulic lift mechanism (i.e., an SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively opens and closes an inlet passage 18 to a cylinder 20. The engine inlet valve 16 is selectively lifted and lowered in response to rotation of an inlet camshaft 22 on which multiple cam lobes (e.g., low-lift cam lobe 24 and high-lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that an SRFF mechanism may operate similarly on an exhaust valve 30.

A control module transitions an SRFF mechanism from a low-lift state to a high-lift state, and vice versa, based on demanded engine speed and load. For example, an internal combustion engine operating at an elevated engine speed, such as 4,000 revolutions per minute (RPMs), typically requires the SRFF mechanism to operate in a high-lift state to provide the desired inlet airflow. Additionally, the valvetrain may be damaged if operated in low-lift state at high engine speeds. Hydraulic cam phaser movement and positioning is achieved by controlling the flow of oil to the cam actuator such as a phaser. The flow control is done with a valve capable of supplying oil to a volume on one side of a vane in a phaser while simultaneously providing a path for the volume on the other side of the vane to vent or return to a tank. The rate of oil flow is a function of the area of the flow port that is exposed. The control of the flow is achieved by varying the amount of force applied to the valve spool, which may be obtained from a solenoid.

When turning off an engine, the valves may be in various states. When the engine is restarted, starting times may increase if the valves are in various or unknown states of lift and wear on the valve components may be generated due to potential critical shifts from uncontrolled lift changes.

SUMMARY

The present disclosure provides a system and method that synchronizes the lift change while disabling the engine so that a subsequent start will be from a default lift state.

In one aspect of the disclosure, a method of controlling an engine includes detecting an engine shut-down signal, and thereafter commanding a first lift state. The method also includes determining a shut-down delay period and before the shut-down delay period, continuing spark and fuel control. The method further includes after the shut-down delay period, ending spark and fuel control to shut down the engine.

In another aspect of the disclosure, a control module includes a lift command module that commands a first lift state after detecting an engine-off signal and a shut-down delay determination module that determines a shut-down delay period, that continues spark and fuel control before the shut-down delay period and that ends spark and fuel control to shut down the engine after the shut-down delay period.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
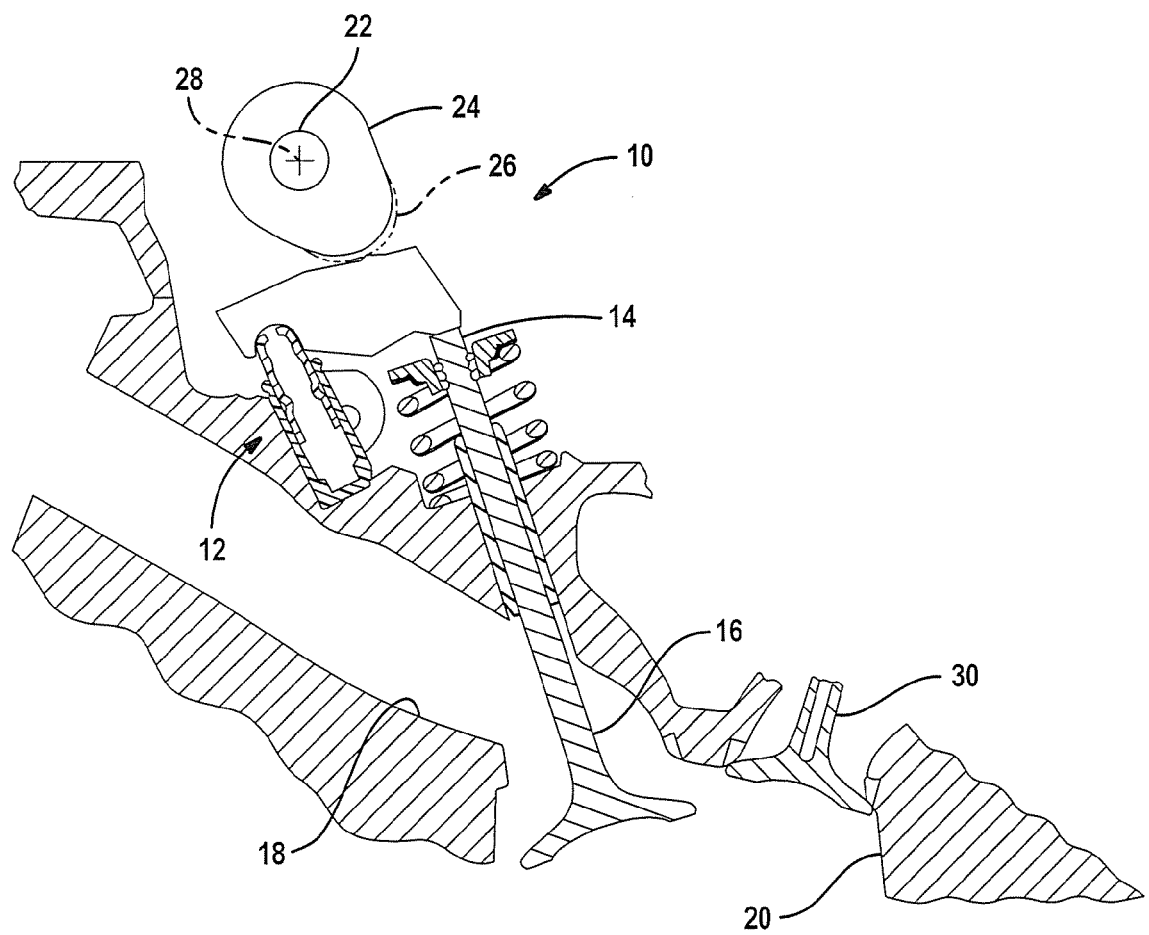
FIG. 1 is a cross-sectional view of an exemplary hydraulic-lift mechanism according to the prior art.

The following description of the preferred embodiment is merely exemplary in nature and is in no way intended to limit the disclosure, its application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
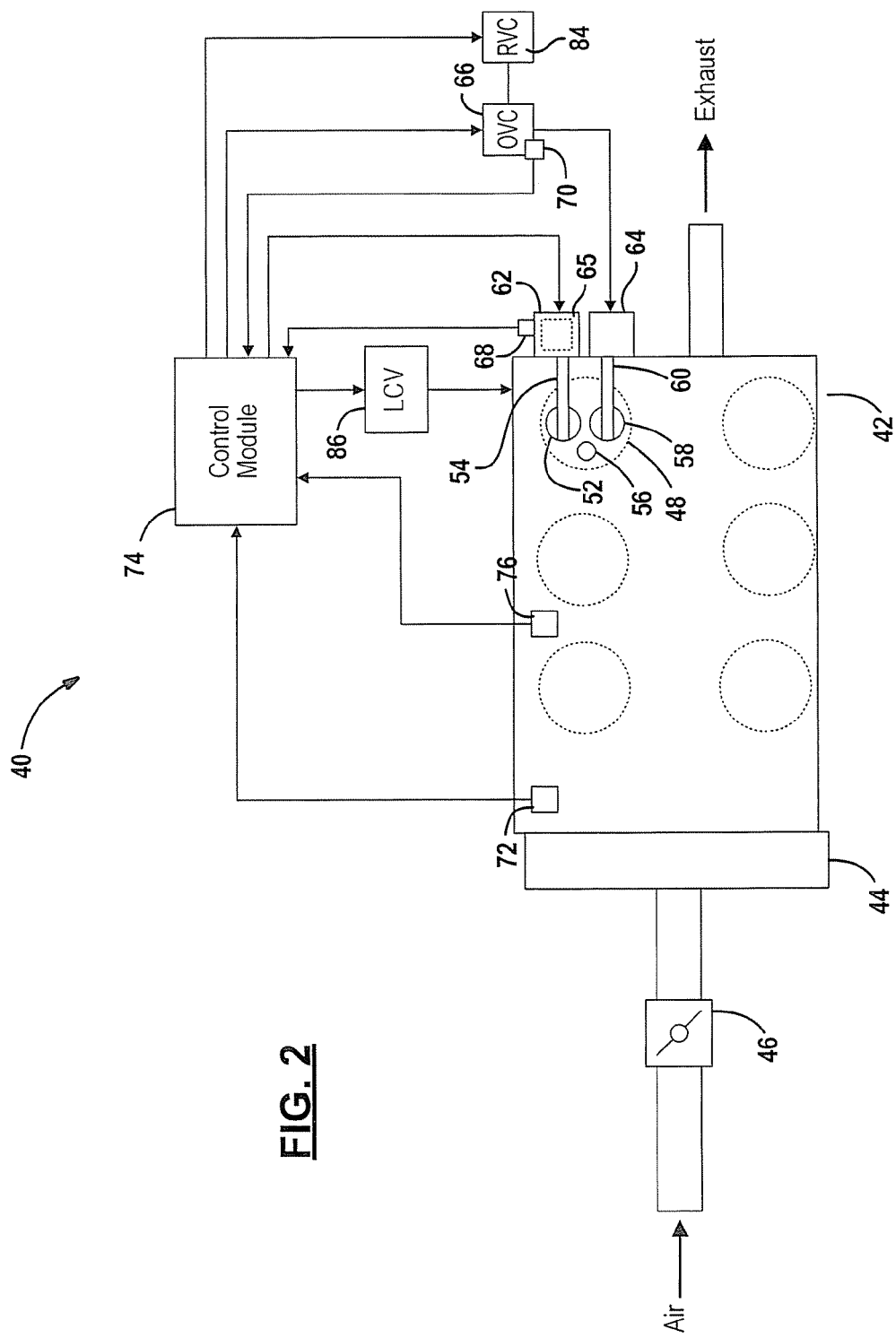
FIG. 2 is a functional block diagram of an exemplary vehicle including a control system according to the present disclosure.

Referring now to FIG. 2, an engine system 40 includes an engine 42 that combusts an air and fuel mixture to produce drive torque. Air is drawn into an intake manifold 44 through a throttle 46. The throttle 46 regulates mass airflow (MAF)

into the intake manifold 44. Air within the intake manifold 44 is distributed into cylinders 48. Although six cylinders 48 are illustrated, it is appreciated that the diagnostic system of the present disclosure can be implemented in engines having a plurality of cylinders including, but not limited to, 2, 3, 4, 5, 8, 10, and 12 cylinders.

A fuel injector (not shown) injects fuel that is combined with the air as it is drawn into the cylinder 48 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within each cylinder 48.

An intake valve 52 selectively opens and closes to enable the air/fuel mixture to enter the cylinder 48. The intake valve position is regulated by an intake camshaft 54. A piston (not shown) compresses the air/fuel mixture within the cylinder 48. A spark plug 56 initiates combustion of the air/fuel mixture, driving the piston in the cylinder 48. The piston drives a crankshaft (not shown) to produce drive torque. Combustion exhaust within the cylinder 48 is forced out an exhaust port when an exhaust valve 58 is in an open position. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of air/fuel mixture ingested into the cylinder 48, and therefore the engine torque, is regulated.

The cam phaser 62 can include a phaser actuator 65 that is either electrically or hydraulically actuated. Hydraulically-actuated phaser actuators 65, for example, include an electrically-controlled fluid oil control valve (OCV) 66 that controls a fluid supply flowing into or out of the phaser actuator 65.

Additionally, low-lift cam lobes (not shown) and high-lift cam lobes (not shown) are mounted to each of the intake and exhaust camshafts 54, 60. The low-lift cam lobes and high-lift cam lobes rotate with the intake and exhaust camshafts 54 and 60 and are in operative contact with a hydraulic lift mechanism, such as a switching roller finger follower (SRFF) mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low lift and high lift, and are based on the low-lift cam lobes and high-lift cam lobes, respectively. During "normal" operation (i.e., low-lift operation or a low-lift state), a low-lift cam lobe causes the SRFF mechanism to pivot to a second position in accordance with the prescribed geometry of the low-lift cam lobe, and thereby open one of the intake and exhaust valves 52 and 58 a first predetermined amount. During high-lift operation (i.e., a high-lift state), a high-lift cam lobe causes the SRFF mechanism to pivot to a third position in accordance with the prescribed geometry of the high-lift cam lobe, and thereby opening one of the intake and exhaust valves 52 and 58 to open a second predetermined amount greater than the first predetermined amount. The lift control valve (LCV) 86 adjust the amount of valve lift hydraulically or using other methods.

A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. It is anticipated that one or more pressure sensors 70 can be implemented. An engine speed and position sensor 72 is responsive to a rotational speed of the engine 42 and generates an engine speed signal in revolutions per minute (RPMs). The position of the crankshaft may also be determined by sensor 72.

A control module 74 includes a processor and memory, such as random access memory (RAM), read-only memory (ROM), and/or other suitable electronic storage. The control module 74 communicates with the position sensor 68, the pressure sensor 70, and the engine speed sensor 72. The control module 74 may receive input from other sensors 76 of the exemplary vehicle including, but not limited to, oxygen sensors and/or engine coolant temperature sensors.

The control module 74 executes a method of shutting down the engine so that the valves are in a predetermined state upon restarting the engine.

The OCV 66 may be powered by a regulated voltage control module 84 that has an actual voltage output. The typical or rated voltage from the regulated voltage control module 84 may be referred to as nominal voltage, whereas the actual output voltage of the regulated voltage control module may vary over time. The regulated voltage control module 84 may have a range, for example, between 11.5 and 14.5 volts. The change in the output voltage of the regulated voltage control module may result in a different force being applied to the solenoid operating the OCV 66.

Figure 3:
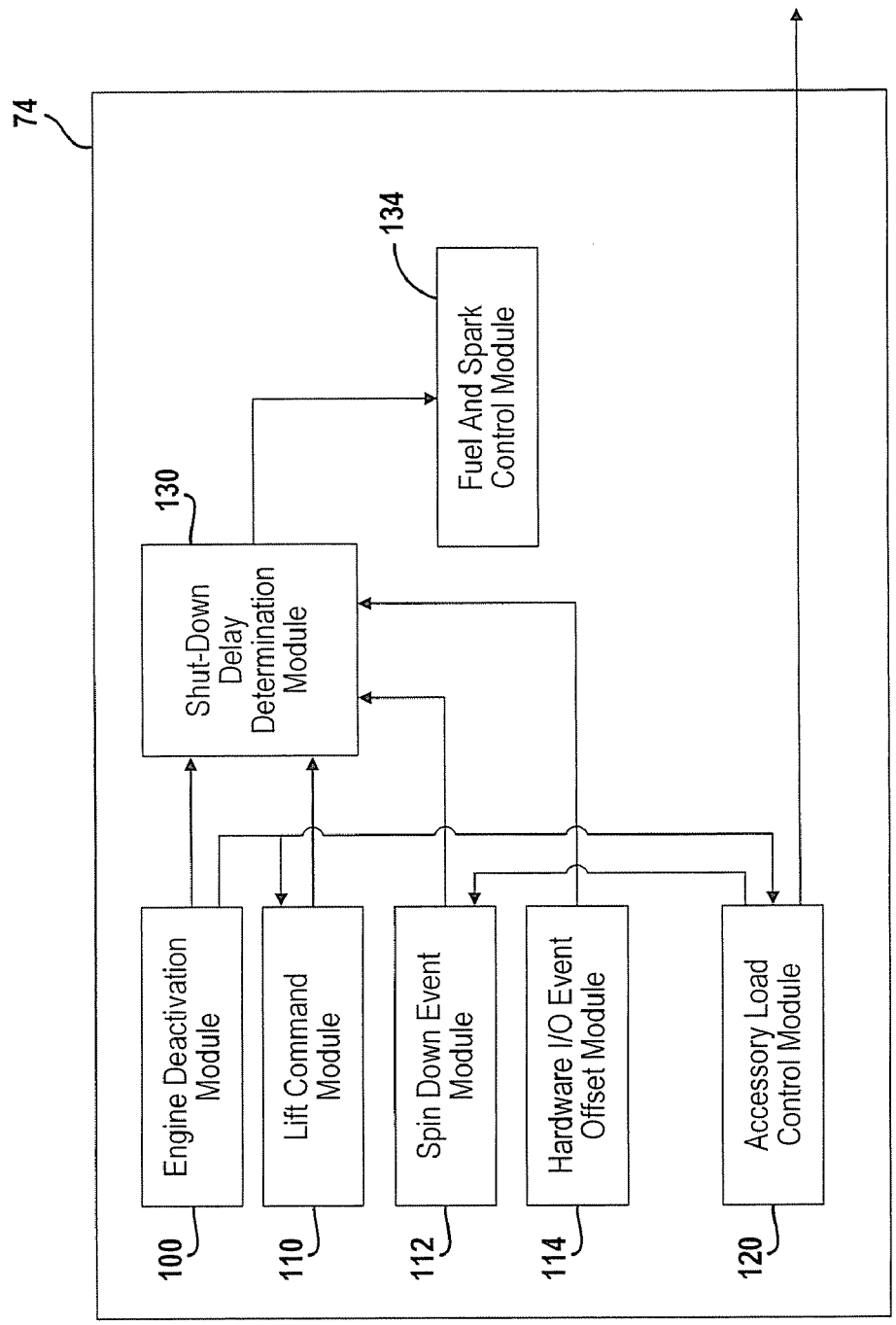
FIG. 3 is a detailed block diagrammatic representation of the control module 74.

Referring now to FIG. 3, the control module 74 is illustrated in further detail. The control module 74 may include an engine deactivation module 100 that generates an engine deactivation signal or engine shut-down signal. The engine deactivation signal may be generated from various sources including an ignition switch that moves from a RUN position to an OFF position. In keyless vehicles, the engine deactivation module may generate an engine deactivation signal from a PUSH button or the like.

The control module 74 may also include a lift command module 110. The lift command module 110 may generate lift commands. In the following example, the default mode for the engine is the high-lift state. Of course, the low-lift state may also be the default mode. The lift command module generates lift commands to move the cam components, including the SRFFs, to a particular state. The engine deactivation module 100 may provide the engine deactivation signal to the lift command module 110. In response to the engine deactivation signal, the lift command module 110 may command the valve components into the high-lift state or the low-lift state.

The spin-down event module 112 may generate a spin-down event period signal that is a function of the engine speed, the torque due to friction, the torque due to the pump, the torque associated with any accessories, the transmission gear, and the number of cylinders. The spin-down event period corresponds to the time associated for stopping the engine due to friction, taking into consideration the above variables. The spin down event module 112 may also receive an accessory load state from the accessory load control module 120.

The hardware input/output (I/O) event offset module 114 generates a hardware event offset period signal that corresponds to a minimum amount of time that the cam hardware is forced to stay at a low-lift state before reverting to a high-lift state. The hardware I/O event offset period may correspond to a constant corresponding to the minimum low-lift events minus the current low-lift events. That is, the constant is the maximum delay time for remaining within a low-lift event. When the cam lift hardware is already transitioning from the low-lift to a high-lift event, the current low-lift event variable takes this into account. Thus, the hardware I/O event offset is a difference of the minimum low-lift event minus the current low-lift event.

The control module 74 may also include an accessory load control module 120. The accessory load control module 120 may command all of the accessory loads, such as the air-conditioning, generators, and the like, to cease operations. Any pumps associated with the engine may also be stopped to reduce the drag on the engine so that the engine spins more freely. Throttle position and the CAM phasing may be adjusted to reduce engine pumping losses. The engine deactivation module 100 may provide the engine deactivation signal to the accessory load control module 120

A shut-down delay determination module 130 may receive the engine deactivation signal from the engine deactivation module 100. The shut-down delay determination module 130 may also receive the lift command signal from the lift command module 110. The shut-down delay determination module 130 may also receive the spin-down event period signal from the spin-down event module 112. The shut-down delay determination module 130 may also receive a hardware I/O event offset period signal from the hardware I/O event offset module 114.

The shut-down delay determination module 130 may determine a shut-down delay based upon the various inputs from the modules 100-114. The shut-down delay may be a function of the maximum low-lift to high-lift event period, which is the maximum number of time between a low-lift event and a high-lift event. This number is increased by the hardware I/O event period. The spin-down event period may be subtracted from the sum of the maximum low-lift to high-lift event period and the hardware I/O event offset period.

The shut-down delay determination module 130 may generate a shut-down delay signal that is decremented so that the engine is prevented from shutting down for a predetermined amount of time. By waiting the predetermined amount of time, the position of the valves may be changed to a default state, such as, in this case, a high-lift state. The shut-down time allows for synchronous changes to the lift state and only disables fuel and spark on the cylinders when the engine has sufficient momentum to finish the lift state change at the appropriate safe switching crank angles, before the engine comes to a complete stop. The shut-down delay determination module will continue fuel and spark by controlling the fuel and spark control module 134 during the shut-down delay time period. After the shut-down delay time period, the fuel and spark control module will be commanded to stop the fuel and spark to the engine.

Figure 4:
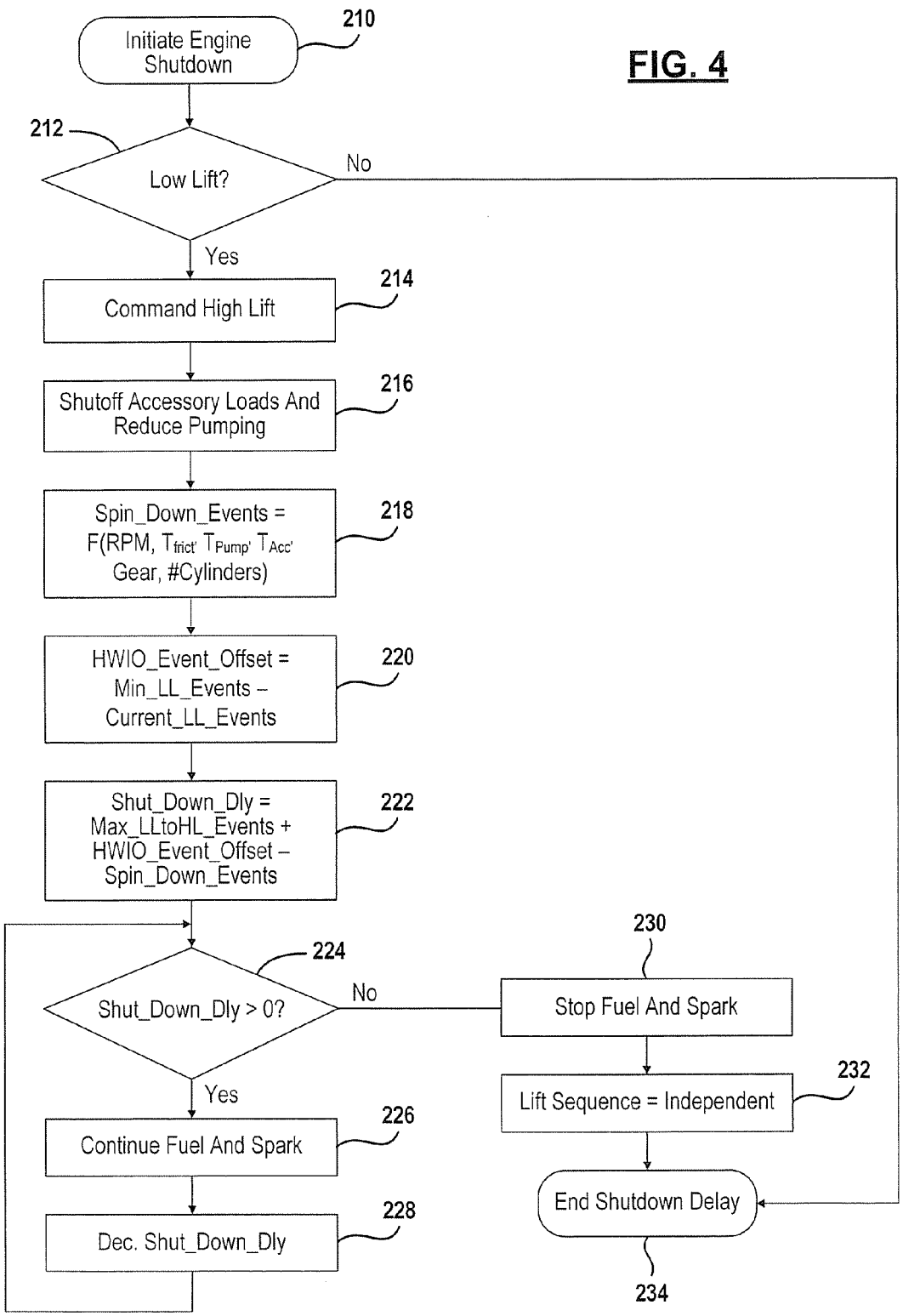
FIG. 4 is a flowchart of a non-intrusive method for protecting the hardware according to the present disclosure.

Referring now to FIG. 4, a method for synchronizing a two-step cam lift deactivation upon engine shut-down is set forth. In step 210, the engine shut-down is initiated. As mentioned above, the engine shut-down may be initiated by turning a key to the OFF position or by selecting a button in the keyless system.

In step 212, it is determined whether the valves are in a low-lift state. In step 212, if the valves are in a low-lift state, step 214 commands the lift mechanism to a high-lift state. In this example, high-lift state is desired before engine shut-down. In step 216, the accessory loads are shut off and pumping losses are reduced. For example, the various accessories, such as the air-conditioning, generator, power steering pump or the like, may be shut down. The pumping losses may be reduced by changing the cam phasing or the throttle position.

In step 218, the spin-down event period is determined. The spin-down event period may correspond to a time associated with spinning down the engine based upon various physical conditions or the engine. For example, the spin-down event period may be a function of the engine speed, the torque associated with the friction of the engine, the torque associated with the pumping of the engine, the accessory torque, the position of the gear such as park, neutral or drive, and the number of cylinders of the engine.

In step 220, the hardware I/O event offset period is determined. As mentioned above, the hardware I/O event offset period may correspond to the amount of time that a low-lift state must be maintained before initiating a switch back to a high-lift state. The hardware I/O event offset period may correspond to a minimum low-lift event period, which may be a constant for the particular engine configuration minus the current low-lift event period or the relative timing from the minimum low-lift event. The current low-lift event period is the amount of time since the beginning of the minimum low-lift event period.

In step 222, the shut-down delay corresponds to a maximum low-lift to high-lift event period that is a fixed number corresponding to the time period associated from transitioning to the low-lift to high-lift event period. The shut-down delay may also be a function of the hardware I/O event offset determined in step 220, which is added to the maximum low-lift to high-lift event period. The spin-down events determined in step 220 are subtracted from the sum of the maximum low-lift to high-lift event period and the hardware I/O event offset. In step 224, the shut-down delay is compared to zero. When the shut-down delay is greater than zero, the fuel and spark is continued to be provided to the engine in step 226. The shut-down delay period is decremented in step 228. After step 228, step 224 again checks the shut-down delay and determines whether it is greater than zero. If the shut-down delay is not greater than zero, then step 230 stops the fuel and spark to the engine. The engine still has sufficient momentum to complete the proper synchronous transition to desired lift state In this case the default mode for the lift mechanism is in a high-lift state. In step 232, the lift sequence is set as independent, which removes the exhaust to intake lift sequence dependency and thus allows faster transition to the desired lift state. This dependency is only required when the engine lift state is changed while the engine is fueled. In step 234, the shut-down delay is ended.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A control system for an engine, the system comprising:
a lift command module that commands a first lift state after detecting an engine shut-down signal; and a shut-down delay determination module that determines a shut-down delay period that continues spark and fuel control before the shut-down delay period and that ends spark and fuel control to shut down the engine after the shut-down delay period.

2. A control system as recited in claim 1 wherein an engine deactivation module generates an engine shut-down signal.

3. A control system as recited in claim 1 further comprising an accessory load control module that disables accessory loads after the lift command module commands the first lift state.

4. A control system as recited in claim 1 further comprising an accessory load control module that reduces pumping loads after the lift command module commands the first lift state.

5. A control system as recited in claim 1 wherein the shut-down delay determination module determines the shut-down delay period based on spin-down event period.

6. A control system as recited in claim 5 wherein the spin-down event period is based on at least one of engine speed, friction torque, pump torque, engine accessory torque, transmission gear, and engine cylinder count.

7. A control system as recited in claim 5 wherein the spin-down event period is based on engine speed, friction torque, pump torque, engine accessory torque, transmission gear, and engine cylinder count.

8. A control system as recited in claim 1 wherein the shut-down delay period is based on a hardware event offset period.

9. A control system as recited in claim 8 wherein the hardware event offset period comprises a difference of a minimum low-lift event period and a current low-lift event period.

10. A control system as recited in claim 1 wherein the shut-down delay period is based on spin-down event period, a hardware event offset period and a maximum low-lift to high-lift event period.

11. A method of controlling an engine, the method comprising:

detecting an engine shut-down signal;
thereafter, commanding a first lift state,
determining a shut-down delay period;
before the shut-down delay period, continuing spark and fuel control; and
after the shut-down delay period, ending spark and fuel control to shut down the engine.

12. A method as recited in claim 11 wherein detecting an engine shut-down signal comprises detecting an engine shut-down signal from an ignition system.

13. A method as recited in claim 11 wherein, after commanding a first lift state, disabling accessory loads.

14. A method as recited in claim 11 wherein, after commanding a first lift state, reducing pumping loads.

15. A method as recited in claim 11 wherein determining a shut-down delay period comprises determining the shut-down delay period based on spin-down event period.

16. A method as recited in claim 15 wherein the spin-down event period is based on at least one of engine speed, friction torque, pump torque, engine accessory torque, transmission gear, and engine cylinder count.

17. A method as recited in claim 15 wherein the spin-down event period is based on engine speed, friction torque, pump torque, engine accessory torque, transmission gear, and engine cylinder count.

18. A method as recited in claim 11 wherein determining a shut-down delay period comprises determining the shut-down delay period based on a hardware event offset period.

19. A method as recited in claim 18 wherein the hardware event offset period comprises a difference of a minimum low-lift event period and a current low-lift event period.

20. A method as recited in claim 11 wherein determining a shut-down delay period comprises determining the shut-down delay period based on spin-down event period, a hardware event offset period and a maximum low-lift to high-lift event period.

\* \* \* \* \*